H. JAMES.
HYDRANT-VALVE.
No. 171,138. Patented Dec. 14, 1875.
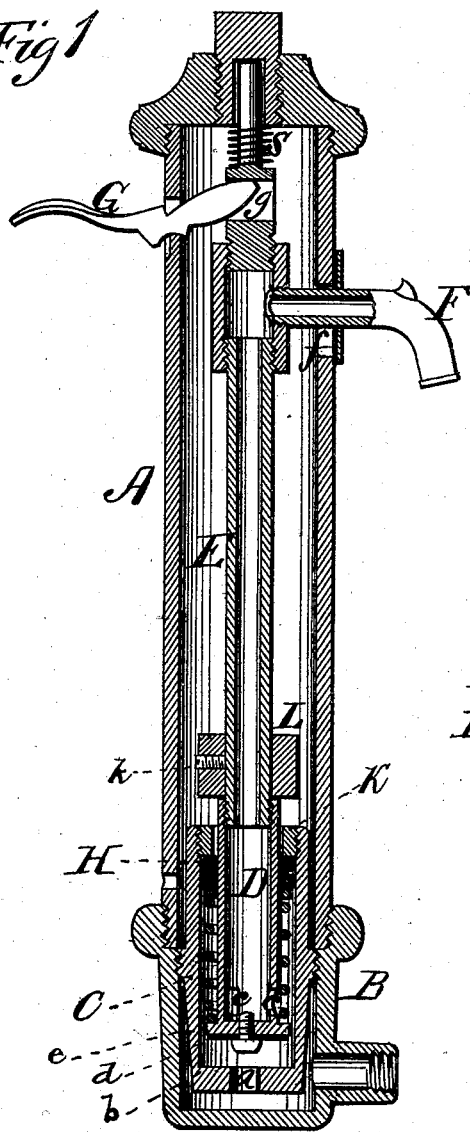
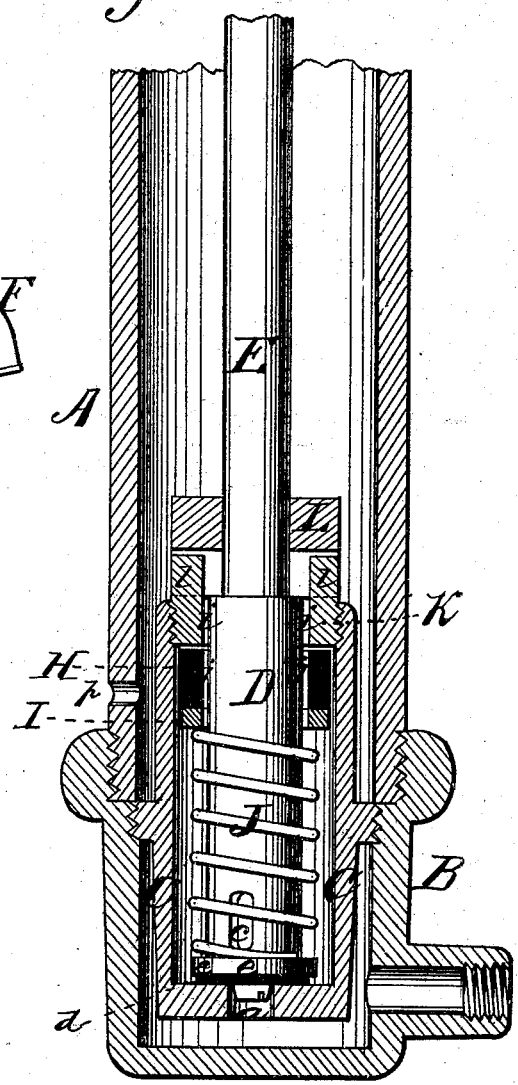
WITNESSES
Robt. Everett
Francis J. Masi
INVENTOR
Henry James
Chipman Hosmer & Co.
ATTORNEYS

UNITED STATES PATENT OFFICE.

HENRY JAMES, OF HUDSON, NEW YORK, ASSIGNOR TO GIFFORD BROTHERS, OF SAME PLACE.

IMPROVEMENT IN HYDRANT-VALVES.

Specification forming part of Letters Patent No. 171,138, dated December 14, 1875; application filed August 28, 1875.

*To all whom it may concern:*

Be it known that I, HENRY JAMES, of Hudson, in the county of Columbia and State of New York, have invented a new and valuable Improvement in Hydrant-Valves; and I do hereby declare that the following is a full, clear, and exact description of the construction and operation of the same, reference being had to the annexed drawings, making a part of this specification, and to the letters and figures of reference marked thereon.

Figure 1 of the drawing is a representation of vertical central sections of my hydrant, showing my valve.

This invention has relation to improvements in that class of hydrants wherein a tubular valve-stem, serving as a conduit for the water, is used to raise the valve from off its seat, allowing the water to flow through suitable ports in the walls of the said valve, up the hollow stem, through a spout, into a vessel placed for its reception.

The object of the invention is to prevent the water from flowing upward into the hydrant-case when the valve is raised off its seat, thereby directing it through the ports in the valve into the tubular valve-stem up to its exit-port, and to allow the contents of the said stem to escape when the valve is forced from above downward upon its seat, through a suitable eduction-port, out of the hydrant-case, thereby preventing the stem from being choked up or burst by the freezing of the water within the same.

To this end the nature of the invention consists, mainly, in an expansion-ring, which is arranged between the walls of the valve and its casing, and fits loosely within the same, forming water-passages at one or both sides, which ring is stationary, and is adapted to be compressed when the valve is raised off its seat, thereby closing the said passages, and directing the water through ports in the valve up its hollow stem, and which will contract when the valve is returned from above to its seat, thus reopening the said passages, and allowing the contents of the stem to be directed upward through them, out of the valve, into an eduction-port leading from the hydrant-casing, thereby preventing the valve-stem from freezing up, all as will be hereinafter more fully explained.

In the annexed drawings, A designates the outer casing of a hydrant, upon the lower end of which is screwed a cast-metal elbow, B, within which is screwed a cylindrical non-corrodible case, C, having in its lower end an induction-port, *a*, and an annular flange, *b*, forming a seat for a tubular valve, D. This valve is also made of a non-corrodible metal, and is of cylindrical form. It is also hollow, and has in its walls water-passages *c* upon its lower end, a leather or rubber valve-face, *d*, and an annular flange, *e*, the latter serving a purpose which will be hereinafter explained. E designates a hollow metallic valve-stem, which is screwed into valve D, and is provided with a spout, F, passing through and having vertical movement in a slot, *f*, cut in the outer casing A. Valve D is raised off its seat by means of a vertically-vibrating lever, G, which passes through a second slot in the said casing, and engages with a notch, *g*, cut in the solid upper end of the said valve-stem, and it is returned to its seat by means of a helical spring, S, arranged upon the upper cylindrical end of stem E, which, having been compressed when the valve was raised through the medium of operating-lever G, reacts strongly when the lever is released.

In order to prevent waste of water which is forced into the valve-casing when the valve is raised from its seat, the space between the walls of the said valve is partly filled by means of a rubber expansion-ring, H, and a metallic equalizing-washer, I, which latter is held in contact with the ring by means of a coiled helical spring, J, interposed between the said washer and flange *e*, upon the lower end of valve D, and embraces the walls thereof. Expansion-ring H abuts against a metallic nut, K, which fits loosely upon the valve-stem, and is screwed into the open end of the valve-casing, completely closing the same, and forming a water-passage, *i*, between it and the valve-stem, communicating with a water-passage, *j*, formed between the expansion-ring H and washer I, and the outer surface of the walls of valve D. Nut K is of brass, and is provided with two or more projecting lugs, *l*, which engage in corresponding recesses in the under side of an iron collar, L, resting lightly upon nut K, and held against rotation on stem E by means of a screw, k.

When valve D is raised from its seat by the operation of lever G, spiral spring J, arranged on the valve, being strongly compressed, will cause ring H to be expanded, thus blocking up passage-way $j$, and directing the flow of water through ports $c$ in the walls of the valve upward through stem E, into spout F, whence it will be discharged into a suitable receptacle.

When operating-lever G is released, the reaction of spring J will cause valve D to be replaced on its seat, thus cutting off the supply of water from the main, and allowing expansion-ring H to resume its normal position, thus restoring passage-way $j$ and re-establishing its communication with water-way $i$, when the water in valve-stem E, seeking its level, will flow upward through the said passage-ways, between nut K and collar L, and will escape into the hollow of the outer casing A, whence it will be discharged through an eduction-port, $p$, made therein.

By this means the valve-stem and all that portion of the valve lying above or in proximity to the surface of the ground will be automatically drained or freed of water, and all danger of the valve and its stem being clogged or bursted by the freezing of water contained therein is effectually done away with.

What I claim as new, and desire to secure by Letters Patent, is—

1. The expansion-ring H, loosely arranged in the space between the valve D and valve-casing C, in combination with a washer and a compressing-spring, J, substantially as specified.

2. The combination of a compression-ring, H, with spring J, valve D, casing C, and fixed nut K, substantially as specified.

In testimony that I claim the above I have hereunto subscribed my name in the presence of two witnesses.

HENRY JAMES.

Witnesses:
STEPHEN L. MAGOUN,
NELSON P. AIKIN.